(12) United States Patent
Dondurur et al.

(10) Patent No.: US 8,695,281 B2
(45) Date of Patent: Apr. 15, 2014

(54) ROOF REFLECTOR

(71) Applicant: King Fahd University of Petroleum and Minerals, Dhahran (SA)

(72) Inventors: Mehmet Dondurur, Crofton, MD (US); Ahmet Z. Sahin, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 13/900,448

(22) Filed: May 22, 2013

(65) Prior Publication Data

US 2013/0305634 A1  Nov. 21, 2013

Related U.S. Application Data

(63) Continuation-in-part of application No. 13/472,309, filed on May 15, 2012, now abandoned.

(51) Int. Cl.
| | | |
|---|---|---|
| *E04H 9/00* | (2006.01) | |
| *E04H 14/00* | (2006.01) | |
| *B62D 63/04* | (2006.01) | |
| *E04B 7/00* | (2006.01) | |
| *E06B 9/56* | (2006.01) | |
| *E06B 9/17* | (2006.01) | |
| *A01G 13/02* | (2006.01) | |

(52) U.S. Cl.
USPC ......... 52/3; 52/1; 52/23; 160/268.1; 160/270; 47/22.1

(58) Field of Classification Search
USPC ............... 52/1, 2.19, 3, 23, 63, 222, 745.06, 52/DIG. 12, DIG. 14; 160/239, 265, 266, 160/268.1, 270, 272, 273.1; 47/17, 22.1, 47/29.1, 29.5
See application file for complete search history.

(56) References Cited

U.S. PATENT DOCUMENTS

| 721,993 | A | * | 3/1903 | Arnett | 135/121 |
|---|---|---|---|---|---|
| 1,239,421 | A | * | 9/1917 | Metzger | 52/1 |
| 1,689,131 | A | * | 10/1928 | Goodwin | 52/1 |
| 2,857,634 | A | | 10/1958 | Garbade et al. | |
| 3,009,166 | A | * | 11/1961 | Sears | 4/494 |
| 3,101,678 | A | * | 8/1963 | Grube | 104/95 |
| 3,510,996 | A | * | 5/1970 | Popil | 52/64 |
| 3,766,958 | A | * | 10/1973 | Mitchell | 160/84.02 |
| 4,018,024 | A | | 4/1977 | Stelzer | |

(Continued)

FOREIGN PATENT DOCUMENTS

| DE | 4444509 | 6/1996 |
|---|---|---|
| EP | 370550 | 5/1990 |

*Primary Examiner* — Ryan Kwiecinski
(74) *Attorney, Agent, or Firm* — Richard C Litman

(57) ABSTRACT

The roof reflector provides selectively deployable and retractable devices for installation over the roof of a building structure to reduce the amount of solar energy transmitted to the roof proper. The roof reflector may include a thick roll of insulating material that may be unrolled to cover the roof or rolled up for storage. Alternatively, the roof reflector may have a plurality of rigid panels hinged together to extend over the roof or to fold over one another for storage. Yet another alternative is a plurality of rigid panels that telescope into one another for storage. Still another alternative includes a plurality of laterally disposed slats that may be opened and closed in the manner of Venetian blinds. The roof reflector is remotely operated, either mechanically by a hand crank and cable mechanism, or electronically by a remote signal operating an electric motor.

20 Claims, 9 Drawing Sheets

(56) References Cited

U.S. PATENT DOCUMENTS

| | | | |
|---|---|---|---|
| 4,128,307 A * | 12/1978 | Badertscher et al. | 359/596 |
| 4,313,650 A | 2/1982 | Ward et al. | |
| 4,387,533 A * | 6/1983 | Green et al. | 47/17 |
| 4,655,010 A * | 4/1987 | Arquati | 52/63 |
| 4,833,571 A | 5/1989 | Granovsky | |
| 4,858,395 A * | 8/1989 | McQuirk | 52/3 |
| 5,035,091 A * | 7/1991 | Ebato | 52/1 |
| 5,038,517 A * | 8/1991 | Talbott | 47/17 |
| 5,087,092 A | 2/1992 | Antopolsky et al. | |
| 5,259,432 A * | 11/1993 | Danieli | 160/66 |
| 5,265,373 A * | 11/1993 | Vollebregt | 47/17 |
| 5,410,844 A * | 5/1995 | Lynch | 52/63 |
| 5,690,376 A | 11/1997 | Leidal | |
| 5,829,200 A * | 11/1998 | Jones et al. | 52/3 |
| 5,992,088 A * | 11/1999 | Henningsson et al. | 47/22.1 |
| 6,260,308 B1 * | 7/2001 | Looney | 52/63 |
| 6,546,943 B2 * | 4/2003 | Lin | 135/95 |
| 6,662,847 B1 * | 12/2003 | Squibb et al. | 160/84.01 |
| 7,927,178 B2 * | 4/2011 | Alazemi | 449/26 |
| 2003/0172597 A1 * | 9/2003 | Folkema | 52/23 |
| 2004/0035059 A1 * | 2/2004 | Meyer et al. | 52/1 |
| 2005/0120637 A1 * | 6/2005 | Bhobe | 52/1 |
| 2005/0166468 A1 * | 8/2005 | Pierce | 52/23 |
| 2006/0150529 A1 * | 7/2006 | Hogg et al. | 52/23 |
| 2009/0013596 A1 * | 1/2009 | Wang | 47/17 |
| 2009/0145049 A1 | 6/2009 | Roshdy | |
| 2011/0167735 A1 | 7/2011 | Sumner | |

* cited by examiner

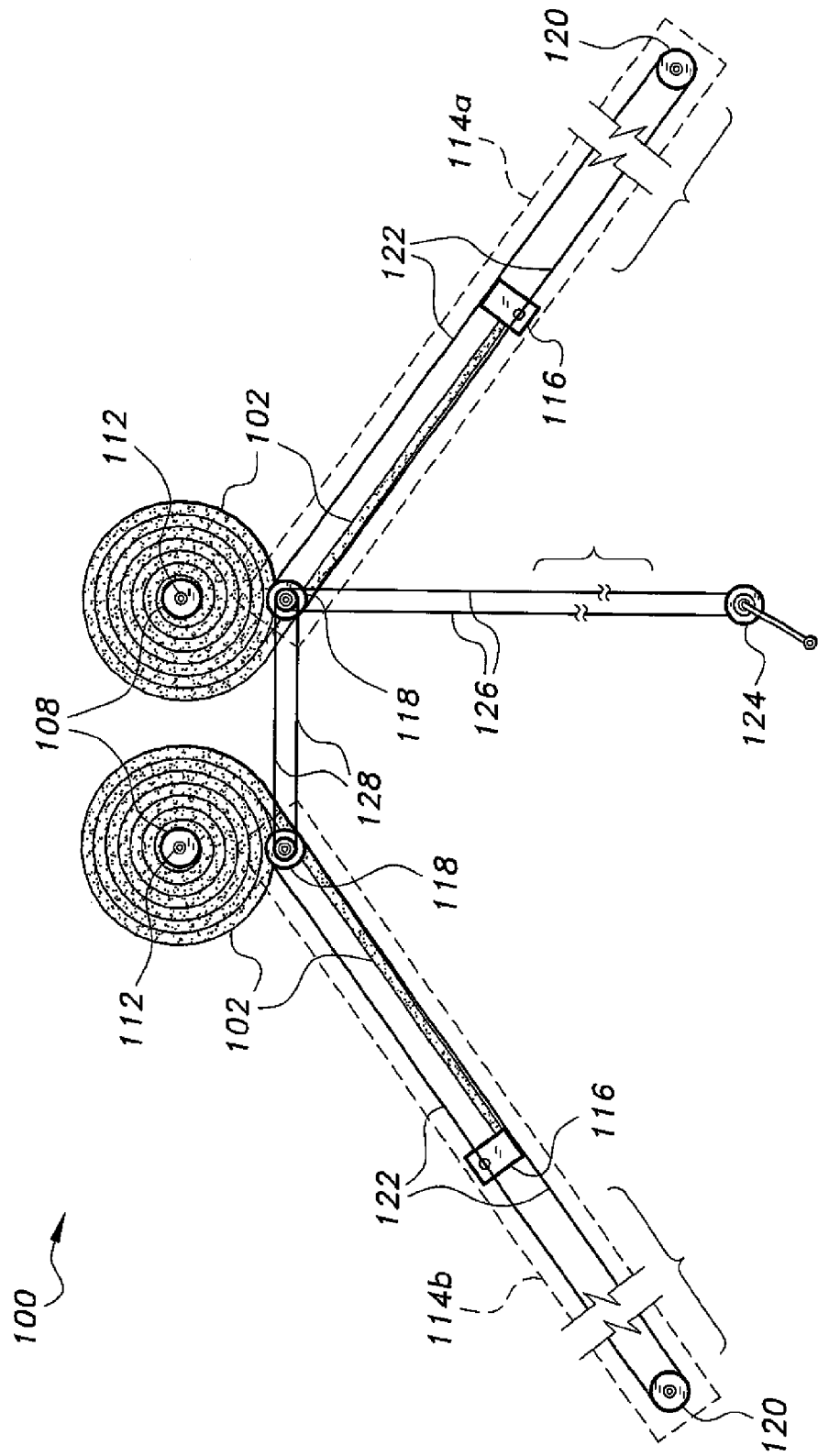

ROOF REFLECTOR

CROSS REFERENCE TO RELATED PATENT APPLICATION

This application is a continuation-in-part of U.S. patent application Ser. No. 13/472,309 filed on May 15, 2012.

BACKGROUND OF THE INVENTION

1. Field of the Invention

The present invention relates to protective covers for structures, and particularly to various embodiments of a roof reflector that is selectively deployable, serving to reduce solar heating of the underlying structure when deployed.

2. Description of the Related Art

The conventional roof of a building structure is constructed of materials that are capable of resisting the deleterious effects of sunlight (including ultraviolet energy) and weather for a prolonged period, generally at least one or more decades. Accordingly, the materials used for such roofing are selected for their durability, rather than their energy reflecting properties. Such roofing materials generally include tar and/or other petroleum based products, which materials are very poor thermal insulators. While other materials are sometimes used for roofing, e.g., composite glass fiber sheets, ceramic tiles, etc., none of these materials possess good thermal insulating characteristics.

Accordingly, standard practice is to install blankets of thermal insulation in the attic or ceiling of a building structure to reduce the amount of heat transmitted through the roof and into the interior of the structure. While such thermal insulation is of great assistance in reducing the heat transmitted into the structure, it is still necessary to provide some additional means of cooling the interior of the structure in warmer climates. This is typically accomplished by the installation of one or more air conditioning units, which of course require a fair amount of energy for their operation. Ever increasing energy costs often result in such air conditioning units not being operated at their optimum, with temperatures within the structure being somewhat warmer than is comfortable for the occupants. The opposite problem often occurs in colder climates, so that the heat escapes through the poorly insulated roofing, resulting in cooler than comfortable temperatures for occupants of the structure.

Accordingly, a number of devices have been developed in the past for installation on rooftops to increase the thermal insulation of the roof structure. An example of such is found in German Patent No. 4,444,509, published on Jun. 20, 1996. This reference describes (according to the drawings and English abstract) a reflective slat for installation over the glazed areas of roofs or walls. The device includes a series of curved, stepped sections for the reflection of sunlight therefrom.

None of the above inventions and patents, taken either singly or in combination, is seen to describe the instant invention as claimed. Thus, a roof reflector solving the aforementioned problems is desired.

SUMMARY OF THE INVENTION

The roof reflector comprises a number of different embodiments, which each include one or more selectively deployable elements for installation atop a roof. The deployment or retraction of each of the embodiments is accomplished remotely by an operator on the surface. The remote operation of the various roof reflector embodiments may be accomplished manually by means of a hand crank and cable system, or electronically by means of an electronic signal to actuate an electric motor installed on the roof with the reflector.

A first embodiment comprises a thick blanket of thermally insulating material that is coated with a reflective upper surface. The blanket may be rolled onto an axle or shaft for storage, or extended from the axle to cover the underlying roof. Laterally opposed tracks extend along the edges of the roof to guide the cover during deployment and retraction.

A second embodiment comprises a plurality of rigid panels that are hinged to one another and fold together for storage. The lowermost and intermediate panels may be drawn up and over a stationary upper panel to retract the assembly, or extended over and down the roof for deployment.

A third embodiment comprises a plurality of mutually telescoping hollow panels. The lowermost panel telescopes into the hollow panel immediately above, that panel telescoping into the next panel immediately above, etc. All of the movable panels telescope into a hollow, fixed uppermost panel for storage of the various panels. The telescoping panels extend selectively from the uppermost panel for deployment over the roof.

A fourth embodiment comprises a plurality of laterally parallel slats that are secured together along their edges by a series of cables. The cables cause the slats to pivot generally about their elongate axes, in a manner similar to that of Venetian blinds. These slats remain deployed upon the roof whether open or closed, although they may be retracted if desired.

These and other features of the present invention will become readily apparent upon further review of the following specification and drawings.

BRIEF DESCRIPTION OF THE DRAWINGS

FIG. 2A is a diagrammatic end elevation view of the roof reflector of FIG. 1, illustrating further details thereof, including a manual deployment mechanism.

DETAILED DESCRIPTION OF THE PREFERRED EMBODIMENTS

The roof reflector includes a number of different embodiments of a selectively deployable and retractable panel or panels that are adapted to reflect solar energy and/or reduce the amount of solar energy transmitted therethrough when deployed. In addition, at least one embodiment may be selectively positioned to either reduce or facilitate solar energy passing therethrough, thereby respectively reducing or increasing interior heating passing into the structure.

Figure 1:
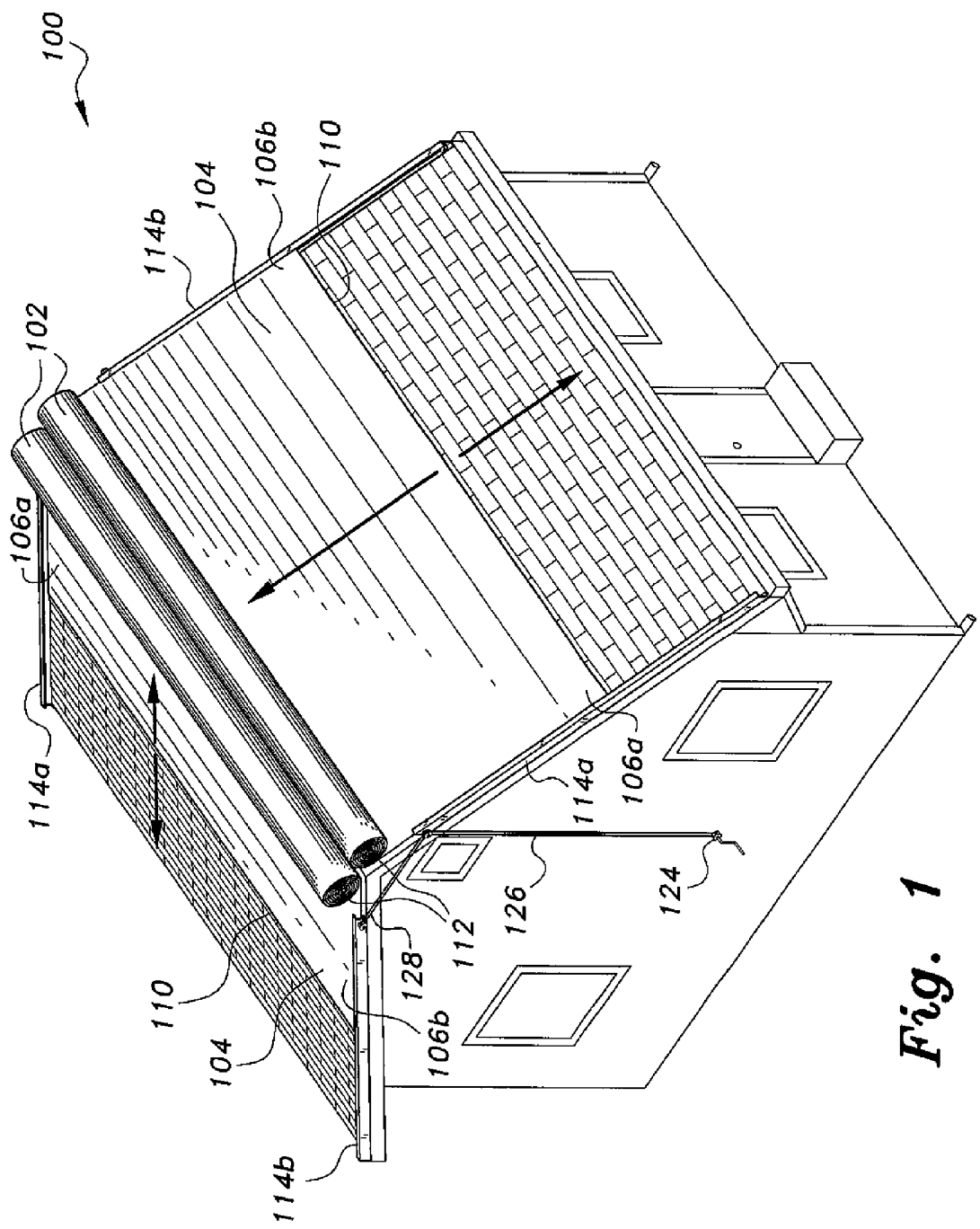
FIG. 1 is an environmental, perspective view of a first embodiment of a roof reflector according to the present invention, comprising a selectively deployed rolled blanket.
Figure 2B:
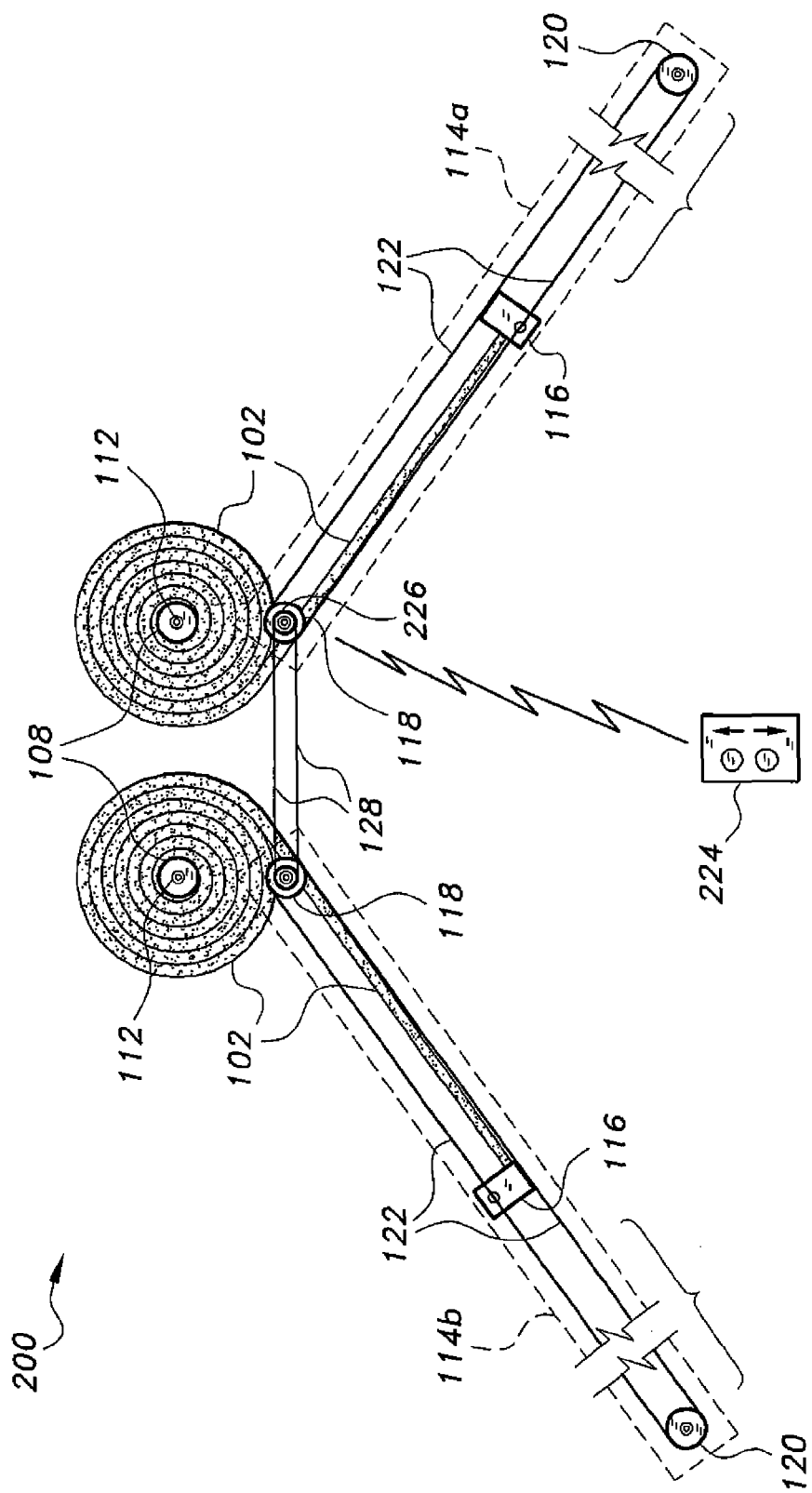
FIG. 2B is a diagrammatic end elevation view of an embodiment of a roof reflector according to the present invention that is similar to the embodiment of FIGS. 1 and 2A, but having a remotely controlled, electrically powered deployment mechanism.

FIGS. 1 through 2A illustrate a first embodiment of the roof reflector, comprising roof reflector 100. The roof reflector 200 of FIG. 2B is identical to the embodiment 100 of FIGS. 1A and 2A, with the exception of the actuating mechanism. The roof reflector 100 includes mutually opposed first and second flexible blankets 102 of a thermal insulation material, e.g., flexible foam plastic sheet material, glass fiber batting, etc. The flexible blankets 102 are shown partially deployed in FIGS. 1 through 2B, the remaining portions of the blankets being shown rolled for storage. The upper or exposed surfaces 104 of the two blankets 102 are coated with a solar reflective material, e.g., an aluminized coating. Each of the blankets 102 has mutually opposed first and second lateral edges 106a and 106b, a roller attachment edge 108 (shown in end view in FIGS. 2A and 2B, attached to the rollers), and a lower or distal edge 110.

A roller or axle 112 is installed along and parallel to the roof ridge for each blanket 102. Each roller 112 provides for attachment of the roller attachment edge 108 of the respective blanket 102 thereto. The two rollers 112 may be directly driven by any practical means to deploy and retract the blankets 102, but the flexible nature of the blankets 102 requires some means of drawing their lower or distal edges 110 downward and outward from the rollers 112 for the deployment of the covers or blankets 102. Accordingly, mutually opposed tracks or channels 114a, 114b are provided along the laterally opposed gabled eaves of the roof. The corresponding lateral edges 106a, 106b of the blankets 102 are disposed in and travel along the tracks 114a, 114b. The tracks 114a, 114b are shown in broken lines in FIGS. 2A and 2B, in order to show the internal actuating structure for the roof reflector 100.

A guide 116 is disposed within each of the tracks 114a, 114b, as shown in FIGS. 2A and 2B. The guides 116 are secured to the lowermost corners of each of the blankets 102, i.e., the junctures of the lateral edges 106a, 106b with the lower edge 110. The guides 116 are drawn upward and downward along their respective tracks 114a, 114b by a cable actuation system comprising an upper pulley 118 adjacent the respective roller 112 and a lower pulley 120 adjacent the lower eaves of the roof. A cable 122 or the like extends around the two pulleys 118, 120 on each side of the roof. The cable 122 is also connected to the respective guide 116. In the example of FIG. 2A, one of the upper pulleys 118 is connected mechanically to a hand crank 124 by a drive cable 126 extending from a pulley at the hand crank 124 to the respective upper pulley 118. Actuation of the cable 122 and its guide 116 for the opposite side of the roof is accomplished by a linking cable 128 connecting the two upper pulleys 118.

In the example illustrated in FIG. 2A of the drawings, turning the hand crank 124 counterclockwise draws the right-hand guide 116 downward along its track 114a due to the lower portion of its cable 122 being connected to the right-hand guide, and also draws the left-hand guide 116 downward due to the upper portion of the left side cable 122 being connected to the left side guide 116, causing the two guides in FIG. 2A to travel in opposite directions from one another when actuated. Due to the flexible nature of the blankets 102, the rotation of the crank 124 in a clockwise direction will not retract the blankets 102 onto their respective rollers 112, but the rollers may be equipped with coil retraction springs (not shown) similar to those found conventionally in roll-up window shades and the like, but on a larger scale.

The roof reflector 200 illustrated in FIG. 2B of the drawings is substantially the same mechanically as that illustrated in FIGS. 1 and 2A and described above, with identical components having identical reference numerals in the two embodiments of FIGS. 1 through 2B. However, the embodiment of FIG. 2B differs from that of FIGS. 1 and 2A due to the actuating means. The embodiment of FIG. 2B deletes the hand crank 124 and drive cable 126 of the embodiment of FIGS. 1 and 2A, and provides an electric motor 226 to drive one of the upper pulleys 118. An electronic control switch or panel unit 224 is provided at some point of convenient access for the operator of the system. The control switch or panel 224 may be located within or on the exterior of the home or other structure having the roof reflector installed thereon. Conventional receivers, relays, and other required components are provided for the remotely operated system of FIG. 2B. Such systems are well known for use in remote garage door opening systems and the like. Such a conventional garage door opening system may be readily modified by those skilled in the art to operate the roof reflector system 200 of FIG. 2B.

Figure 3:
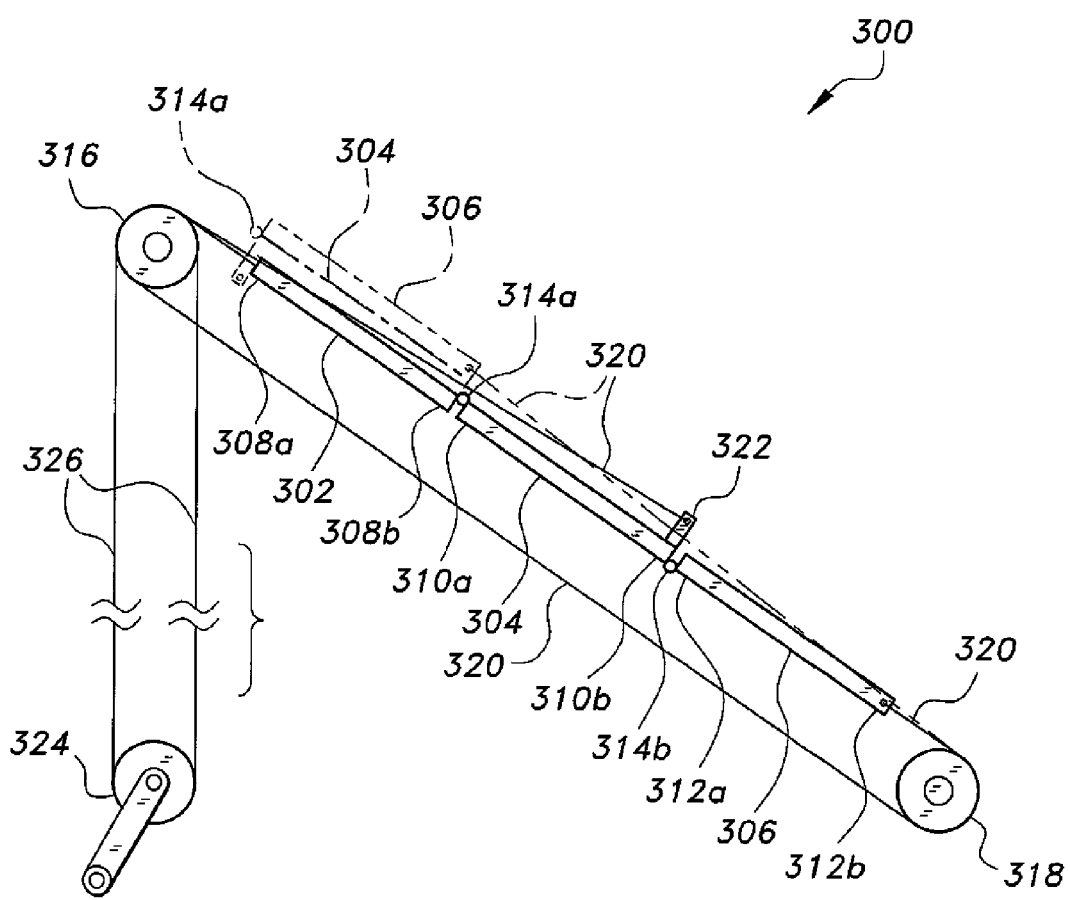
FIG. 3 is a diagrammatic end elevation view of another embodiment of a roof reflector according to the present invention, comprising a plurality of selectively deployed accordion-fold rigid panels.

FIG. 3 of the drawings provides a diagrammatic side or end elevation view of another roof reflector 300, in which a plurality of rigid insulated panels is selectively deployed or retracted to control solar heating of the roof. In the example of FIG. 3, three such panels comprise an upper panel 302, a single medial panel 304, and a lower panel 306, respectively, but it will be seen that as few as two panels may be used or a much larger number of panels may be provided. In all such cases, each panel spans the roof laterally, the uppermost panel 302 being fixed in place. Each of the various panels 302, 304, and 306 is provided with mutually opposed upper and lower edges, i.e., upper and lower edges 308a, 308b for the upper panel 302, upper and lower edges 310a, 310b for the medial panel 304, and upper and lower edges 312a, 312b for the lowermost panel 306. Hinges are provided to connect the adjacent edges of adjacent panels to one another. A first hinge 314a connects the edges 308b and 310a of the first two panels 302 and 304 together, and a second hinge 314b connects the edges 310b and 312a to one another. It will be seen that the hinges 314a and 314b alternate their alignments with the upper and lower surfaces of the panels. This allows the panels to fold in an accordion manner, i.e., the intermediate and lower panels 304 and 306 fold together with their lower surfaces facing one another, while the intermediate panel 304 is pulled upward to fold over the top of the fixed uppermost panel 302, their upper surfaces facing one another when the panels 302 and 304 are folded together, as shown in broken lines in FIG. 3.

The various panels 302, 304, and 306 may be selectively deployed and retracted by a pulley and cable actuation system, as in the embodiments 100 and 200 of FIGS. 1 through 2B. An upper pulley 316 is provided at or near the crest or ridge of the roof, and a lower pulley 318 is installed near the lower eaves. A cable 320 extends downward from its attachment to the lower edge 312b of the lower panel 306 to pass around the lower pulley 318, back up to pass around the upper pulley 316, and thence down to connect to an attachment ear or lug 322 extending from the lower edge 310b of the medial panel 304. It will be seen that when the pulleys 316 and 318 are rotated in a counterclockwise direction, the cable 320 portion or end attached to the lug or ear 322 of the medial panel 304 will be drawn upward and to the left toward the upper pulley 316, thus drawing the lower edge 310b of the medial panel 304 up and to the left in the orientation of FIG. 3. This also draws the lower panel 306 up and to the left. The cable end or portion is connected to the lower edge 312b of the lowermost panel 306, allowing this panel motion due to the counterclockwise rotation of the pulleys 316, 318 and corresponding travel of the cable 320. As this operation continues, the two panels 304 and 306 are drawn to their fully retracted state overlying the fixed uppermost panel 302. The two panels 304 and 306 are shown in broken lines in their fully retracted positions, stacked atop the upper panel 302.

The cable 320 and pulleys 316, 318 are actuated by a remotely located hand crank 324 that actuates a drive cable 326, these components being equivalent to the crank 124 and drive cable 126 of the blanket-type roof reflector 100 of FIGS. 1 and 2A. Alternatively, the electric motor 226 and electronic control switch or panel unit 224 of the embodiment 200 of FIG. 2B may be substituted for the crank 324 and drive cable 326 in the roof reflector 300 of FIG. 3, if desired.

Figure 4:
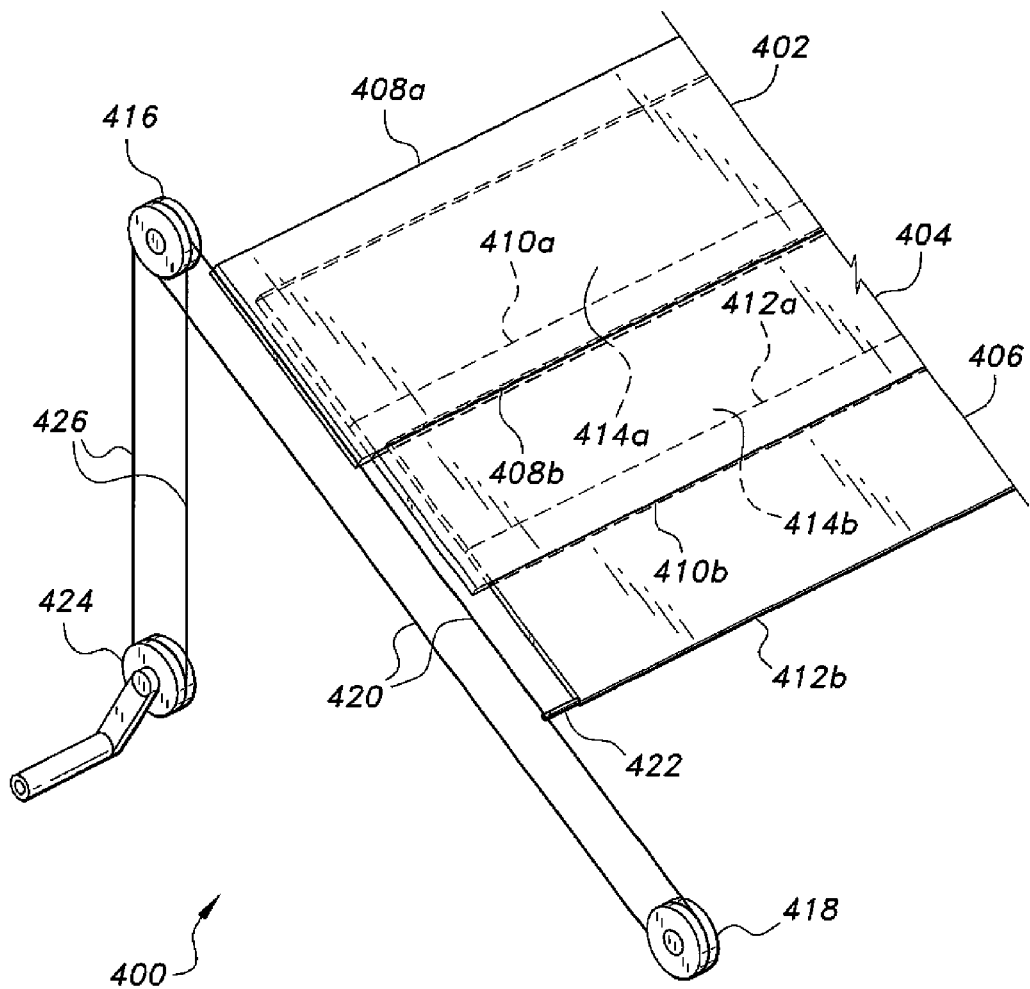
FIG. 4 is a partial perspective view of another embodiment of a roof reflector according to the present invention, comprising a plurality of selectively deployed telescoping rigid panels.

The roof reflector 400 of FIG. 4 also includes a plurality of rigid panels, but the panels of the roof reflector 400 telescope into one another for retraction and storage, rather than folding. FIG. 4 shows three rigid telescoping panels, comprising a fixed upper panel 402, a single intermediate panel 404, and a lower panel 406. As in the roof reflector 300 of FIG. 3, as few as a single movable telescoping lower panel may be provided, or multiple intermediate panels may be provided. Each of the panels 402, 404, and 406 has an upper edge 408a, 410a, and 412a, and an opposite lower edge 408b, 410b, and 412b. At least the uppermost panel 402 and the intermediate panel 404 define hollow interiors 414a, 414b, the lower edges 408b and 410b of these two panels being open. Each successive panel is somewhat thinner and narrower (in lateral span) than the panel immediately above, thus allowing the intermediate panel 404 to slide telescopically into the hollow interior 414a of the upper panel 402 and the lowermost panel 406 to slide telescopically into the hollow interior 414b of the intermediate panel 404.

The cable actuation system of the roof reflector 400 of FIG. 4 is similar to the cable system of the roof reflector 300 of FIG. 3. An upper pulley 416 is installed at a location at or near the crest or ridge of the roof, and a lower pulley 418 is installed at or near the opposite eaves. A continuous cable 420 extends around the two pulleys 416 and 418, the cable 420 also being attached to a fitting 422 (lateral pin, etc.) extending from the lower edge 412b of the lowermost telescoping panel 406. Thus, as the two pulleys 416, 418 are rotated in a counterclockwise direction the upper portion of the cable 420 is drawn upward, thereby drawing the lowermost panel 406 into the next higher panel, i.e., the intermediate panel 404. As the operation continues, the intermediate panel 404 is pushed into the hollow interior 414a of the uppermost panel 402 to complete the retraction. Extension merely requires opposite directional rotation of the pulleys 416 and 418.

The cable 420 and pulleys 416, 418 are actuated by a remotely located hand crank 424 that actuates a drive cable 426, these components being equivalent to the crank 124 and drive cable 126 of the blanket-type roof reflector 100 of FIGS. 1 and 2A and the corresponding crank 324 and cable 326 of the roof reflector 300 of FIG. 3. Alternatively, the electric motor 226 and electronic control switch or panel unit 224 of the roof reflector 200 of FIG. 2B may be substituted for the crank 424 and drive cable 426 in the roof reflector 400 of FIG. 4, if desired.

Figure 5:
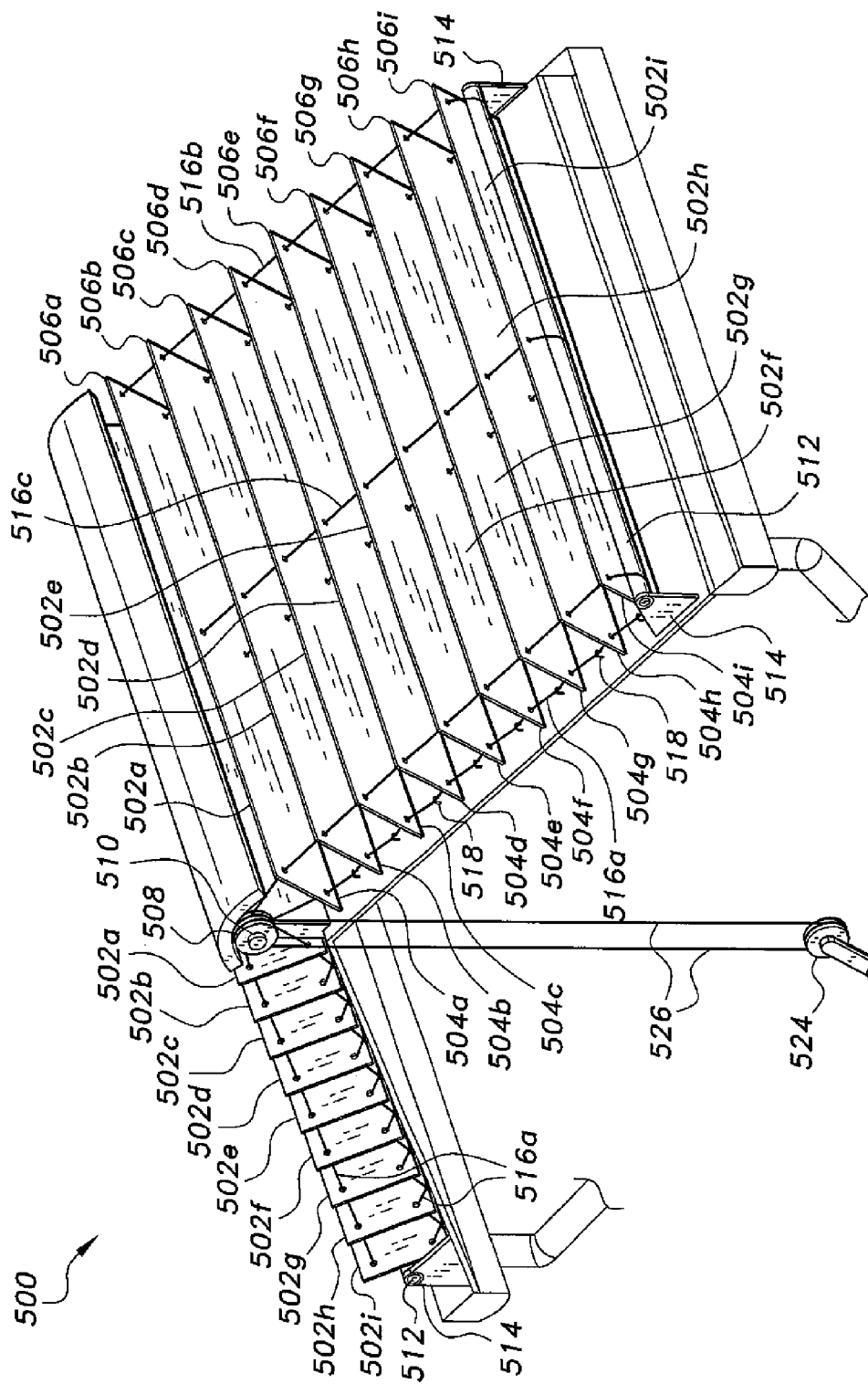
FIG. 5 is a perspective view of another embodiment of a roof reflector according to the present invention, comprising a plurality of selectively pivotal lateral slats.

FIG. 5 of the drawings provides an illustration of a fifth embodiment of the roof reflector 500, comprising a plurality of laterally disposed, parallel, and adjustable rigid panels or slats. As few as two such panels or slats (comprising an upper panel and a lower panel) may be provided, but preferably a plurality of intermediate panels or slats, e.g., 502b through 502h, are provided between the uppermost panel or slat 502a and the lowermost panel or slat 502i. In the roof reflector 500 of FIG. 5, two substantially identical multiple panel or slat systems are provided, one to each side of the ridge or crest of the roof. It will be seen that this basic concept of applying like systems to both slopes or sides of a gabled roof will also apply to the roof reflectors 300 and 400 of FIGS. 3 and 4, where the second system is not shown for clarity in the drawing Figs.

Each of the panels or slats 502a through 502i has mutually opposed first and second ends 504a through 504i and 506a through 506i. An upper pulley 508 is rotationally affixed to an actuator pivot rod or shaft 510 that extends along the crest or ridge of the roof adjacent to the upper panel 502a, the proximal end of the rod or shaft 510 being visible in FIG. 3. An opposite lower anchor rod or shaft 512 is anchored to the roof adjacent the lower eaves and lowermost slat or panel 502i by brackets 514. The lower anchor rod or shaft 512 may be rotationally fixed in the brackets 514 if the actuating cables (described below) are free to travel therearound, or the rod or shaft 512 may rotate in the brackets 514. The brackets 514 may be configured for ease of removal from the underlying roof structure or to facilitate removal of the lower anchor rod or shaft 512 when desired, in order to allow the entire set of panels or slats 502a through 502i to be retracted up the roof and gathered adjacent the crest or ridge line.

The cable actuation system for the roof reflector 500 comprises a continuous, closed loop first actuator cable 516a that passes around the upper pulley 508 (or its pivot rod 510) and continues through the opposite edges of the first ends 504a through 504i of each of the panels 502a through 502i to wrap around the lower anchor rod 512. Similarly, a closed loop second actuator cable 516b passes around the pivot rod 510 at the opposite end thereof to the first cable 516a, and continues through the opposite edges of the second ends 506a through 506i of each of the panels 502a through 502i to wrap around the lower anchor rod 512 at its opposite end from the first cable 516a. Optionally, a third actuator cable 516c may be installed through the medial portions of the panels or slats 502a through 502i in essentially the same manner as that of the two end cables 516a and 516b. The lower portion of the run of each of these cables, i.e., that portion adjacent to the roof surface, is secured to the roof by a series of staples 518 or the like to provide greater stability for the roof reflector panel assembly. The staples 518 may be removed to permit retraction of the panels 502a through 502i.

Rotation of the upper pulley 508 results in rotation of its actuator pivot rod or shaft 510, thus resulting in movement of the cables 516a through 516c. The opposite sides of each of the cables 516a through 516c travel in opposite directions, i.e., the higher sides move opposite the sides that pass through the staples 518. As the panels or slats 502a through 502i are affixed along the cables 516a through 516c, rotation of the pulley 508 results in the panels or slats 502a through 502i rotating or pivoting about their longitudinal centers in a manner similar to that of the operation of Venetian blinds. The panels or slats 502a through 502i may be colored differently on their opposite sides or faces, so that one side has a reflective surface to reduce solar heating into the roof of the structure and the opposite side has a light and heat absorptive surface to capture more heat in cooler conditions. It will be seen that the panels or slats 502a through 502i may be turned so that either of their two surfaces face outward, or they may be set at some intermediate orientation, generally as shown in FIG. 5, for greater ventilation.

The pulley 508 and its cables 516a through 516c are actuated by a remotely located hand crank 524 that actuates a drive cable 526, these components being equivalent to the crank 124 and drive cable 126 of the blanket-type roof reflector 100 of FIGS. 1 and 2A and the corresponding crank 324 and cable 326 of the roof reflector 300 of FIG. 3 and the crank 424 and cable 426 of the roof reflector of FIG. 4. Alternatively, the electric motor 226 and electronic control switch or panel unit 224 of the roof reflector 200 of FIG. 2B may be substituted for the crank 524 and drive cable 526 in the multiple panel or slat roof reflector embodiment 500 of FIG. 5.

Figure 6:
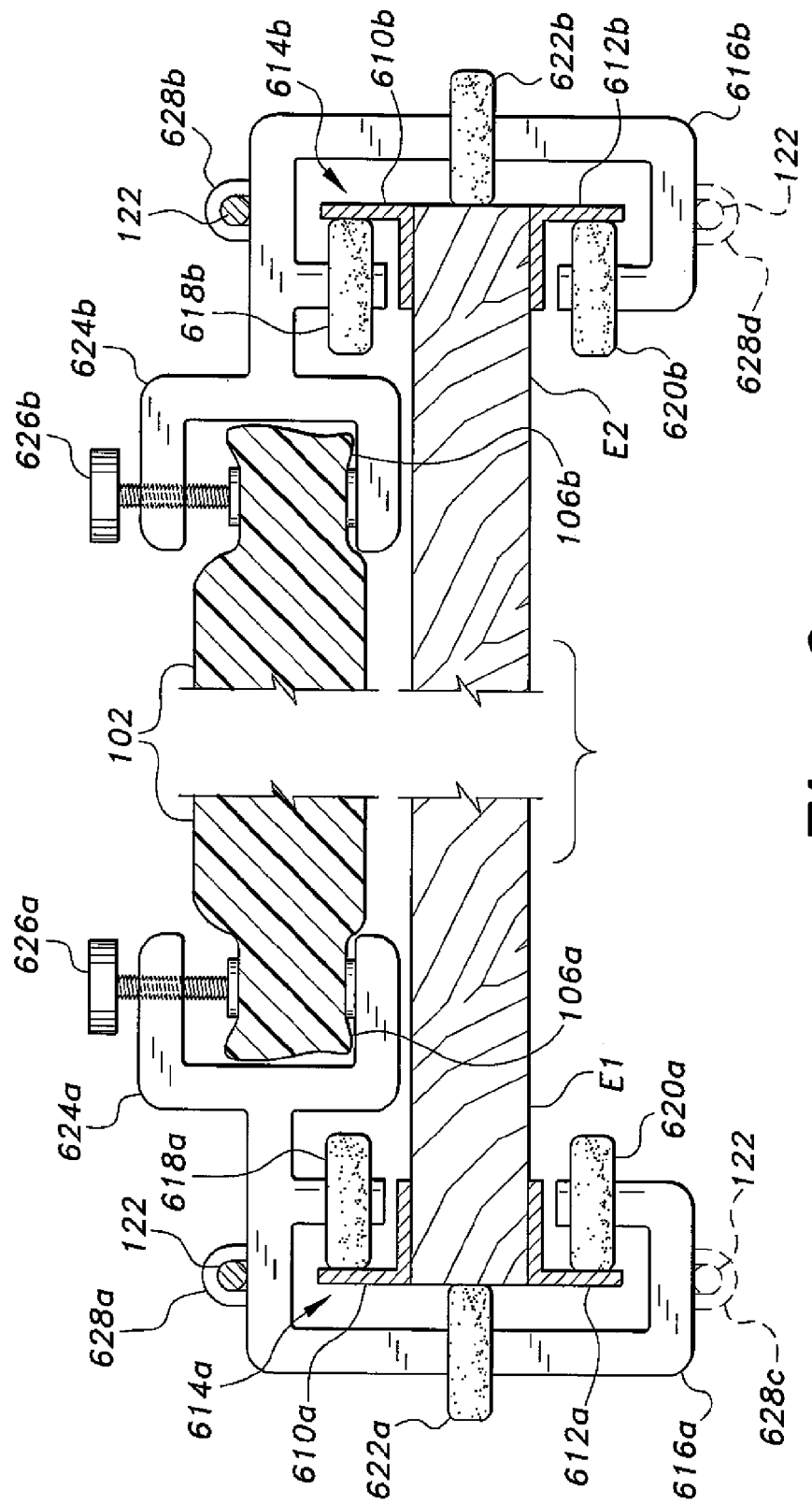
FIG. 6 is an elevation view in section of the eaves track and guide assembly for an alternative embodiment of the rolled blanket roof reflector of FIGS. 1 through 2B.

FIG. 6 provides an end elevation view in section of an alternative embodiment of the wheeled guides and eaves tracks used to draw the thermal blanket up and down over the surface of the roof. The two eaves E1 and E2 are shown in section, in mirror image to one another. Mutually opposed first and second upper angles, respectively 610a and 610b, are attached to the upper edges of the two eaves E1 and E2, and mutually opposed first and second lower angles, respectively 612a and 612b, are attached to the lower edges of the two eaves to capture the respective eaves between each set of upper and lower angles. This configuration results in each upper angle and its respective lower angle forming a guide track 614a and 614b, with each guide track 614a, 614b having a generally L-shaped cross section as shown clearly in FIG. 6.

A wheeled guide 616a, 616b is installed upon each track 614a, 614b. The guides may be formed of bent and welded rigid rod having a circular cross section, or alternatively of other material as desired. The circular cross section allows portions of the rod to serve as axles for the wheels installed on the guides. Each guide 616a, 616b comprises a frame formed in a squared, generally C-shape, in which the ends and center of the C-shape form axles for guide wheels. A first wheel 618a, 618b is installed upon the upper end of each C-shaped guide 616a, 616b to bear against the respective upper angle 610a, 610b. A second wheel 620a, 620b is installed upon the lower end of each C-shaped guide 616a, 616b to bear against the respective lower angle 612a, 612b. A third wheel 622a, 622b is installed upon the center of each guide 616a, 616b to bear against the outer edge of the respective eaves E1, E2 in a direction or orientation opposite that of the first two wheels of each respective guide.

A generally C-shaped roof reflector attachment bracket 624a, 624b extends inward from the upper portion of each guide 616a, 616b. Each of the two brackets 624a, 624b has a configuration generally like that of a conventional C-clamp having a threaded clamp 626a, 626b installed in each bracket 624a, 624b, respectively, to grip the two opposite lateral edges 106a, 106b of the flexible thermal blanket 102.

An upper actuator cable clamp 628a, 628b is installed upon the upper portion of each guide 616a, 616b for the attachment of the cable 122 thereto, in the general configuration shown in FIGS. 2A and 2B of the drawings. Additional cable clamps 628c and 628d are shown in broken lines on the lower portions of the respective guides 616a and 616b, and would be used for guides installed along tracks and eaves to the opposite slope of the roof. It will be seen that the first guide 616a may include both clamps 628a, 628c, but only one of the two clamps would be used, depending upon which side of the roof the guide is installed. In the same manner, the second guide 616b may include both clamps 628b, 628d, but only one of those two clamps would be used.

Figure 7:
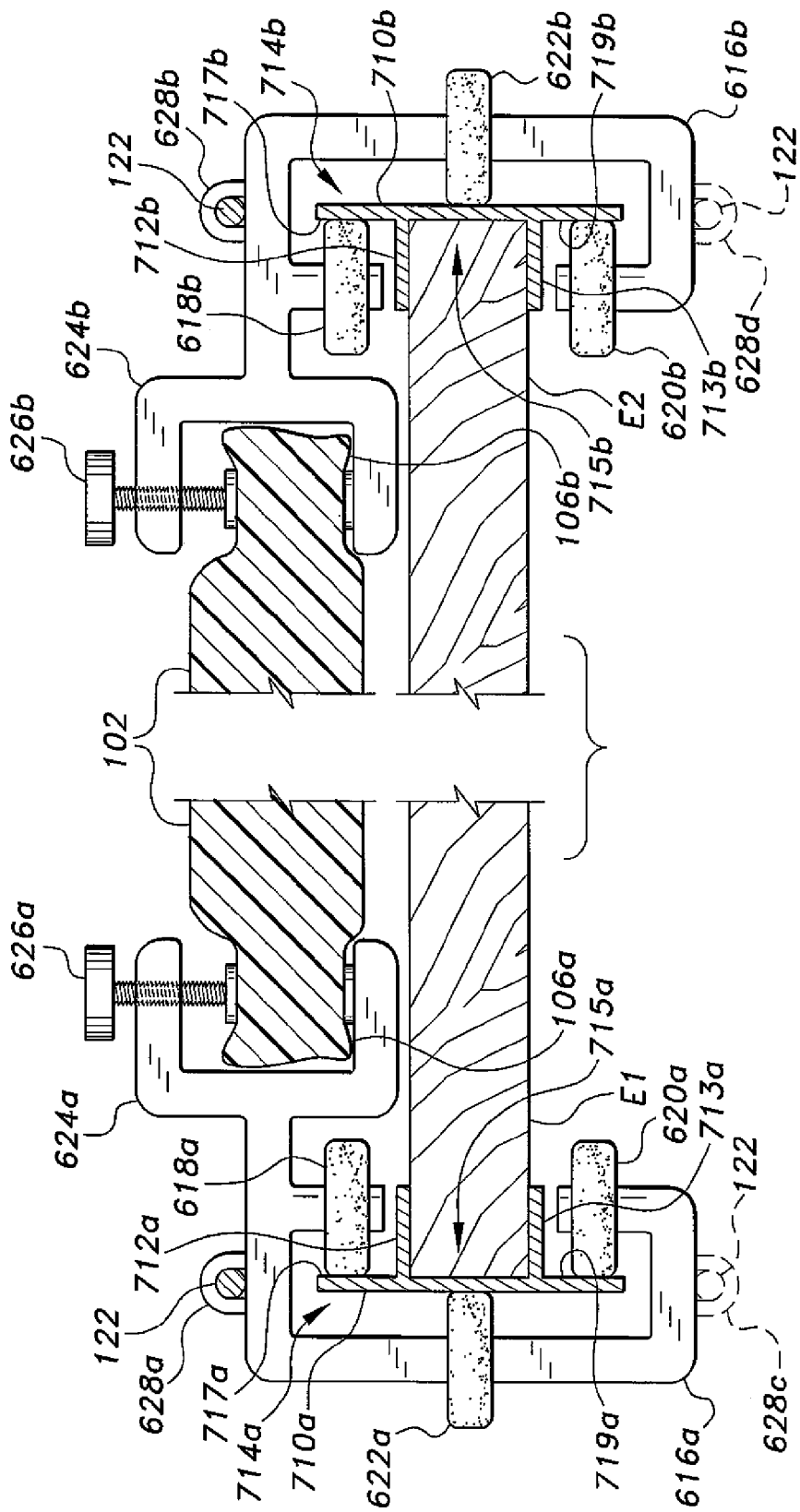
FIG. 7 is an elevation view in section of the eaves track and guide assembly for another alternative embodiment of the rolled blanket roof reflector of FIGS. 1 through 2B.

FIG. 7 provides an end elevation view in section of another alternative embodiment of the wheeled guides and eaves tracks used to draw the thermal blanket up and down over the surface of the roof. The two eaves E1 and E2 are shown in section in mirror image to one another, as in FIG. 6. The two wheeled guides 616a and 616b are identical to those components of FIG. 6 and described above. The only difference between the guide and track configuration illustrated in FIG. 6 and that illustrated in FIG. 7 is in the track installed along the two eaves E1 and E2. In FIG. 7, each of the guide tracks 714a, 714b comprises a flat vertical member or plate 710a, 710b having an upper flange 712a, 712b extending normal thereto and a lower flange 713a, 713b also extending normal thereto and spaced apart from and parallel to the respective upper flange 712a, 712b, so that the track 714a, 714b is T-shaped. Each pair of upper and lower flanges defines an eaves capture channel, respectively 715a, 715b, therebetween. The respective eaves E1,E2 are disposed in the channels 715a, 715b. The vertical member 710a of the first track 714a has first and second or upper and lower wheel bearing surfaces 717a, 719a, extending beyond the respective upper and lower flanges 712a, 712b. The bearing surfaces 717a, 719a serve as bearing surfaces for the first and second or upper and lower wheels 618a, 620a, respectively, of the wheeled guide 616a. The opposite second track 714b is configured in minor image, having wheel bearing surfaces 717b and 719b. The third wheels 622a and 622b bear against the medial outer surface of the respective vertical plates 710a and 710b of the tracks 714a and 714b, on the side opposite the first and second wheels.

Figure 8:
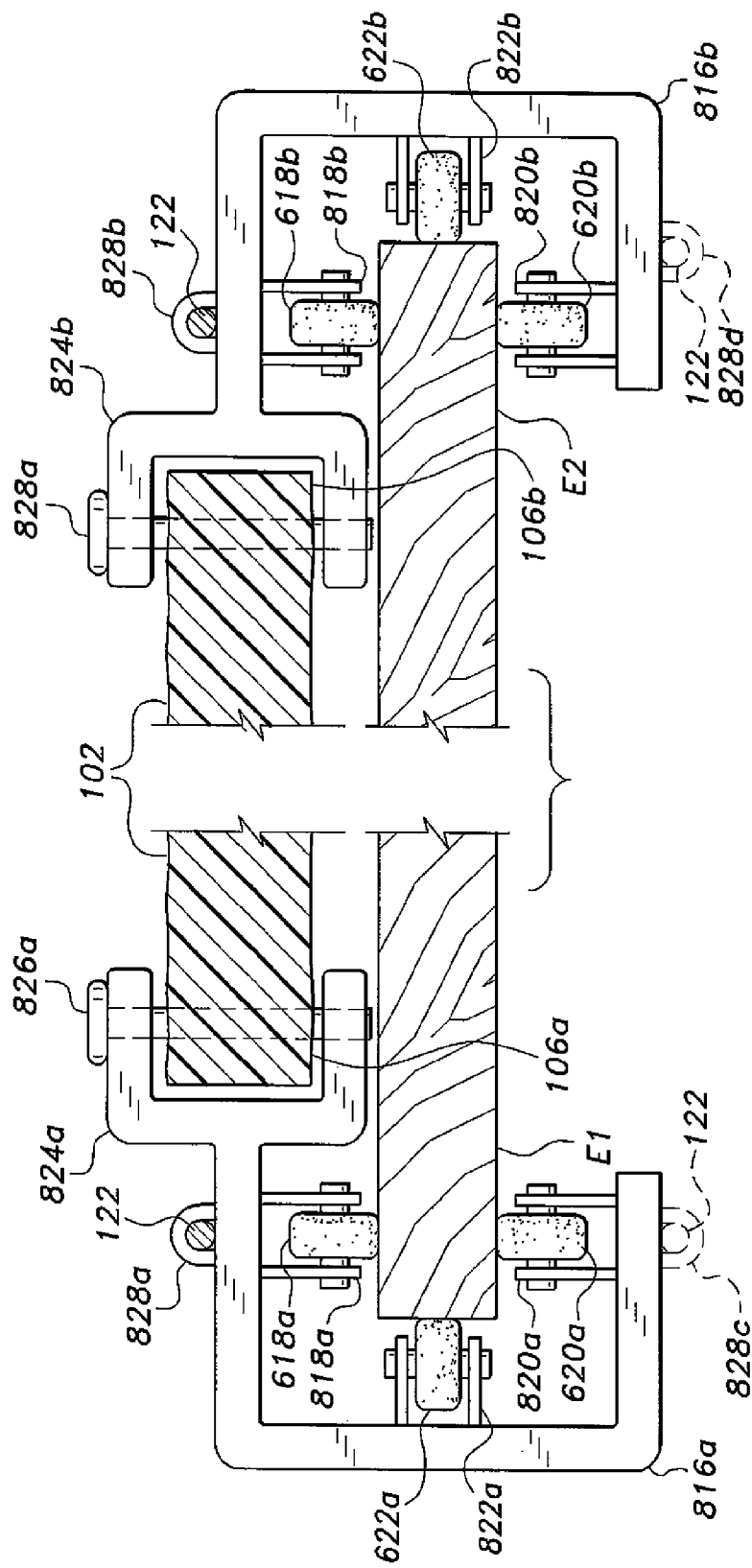
FIG. 8 is an elevation view in section of the eaves guide assembly for another alternative embodiment of the rolled blanket roof reflector of FIGS. 1 through 2B, wherein no eaves track is required.

The wheeled guides of FIG. 8 are somewhat different from the guides 616a, 616b of FIGS. 6 and 7, as the configuration illustrated in FIG. 8 does not require any form of guide track. Rather, the wheels of the two guides 816a, 816b of the embodiment of FIG. 8 roll directly upon the surfaces of the eaves E1 and E2. The two guides 816a and 816b are in mirror image to one another, having identical components. Accordingly, only the first guide 816a is described in detail, like components for the guide 816b being designated by corresponding numerals with the letter "b" following. The guide 816a comprises a length of extruded material having a first or upper wheel 618a housed in an inwardly facing first wheel bracket 818a, an opposite second or lower wheel 620a housed in an inwardly facing second wheel bracket 820a, and a third or medial wheel 622a housed in an inwardly facing third wheel bracket 822a. It will be seen that the first and second wheels 618a and 620a are directly opposed to one another, and the third wheel 622a is normal to the first and second wheels. Thus, the first wheel 618a rolls directly upon the upper surface of the eave E1, the second wheel 620a rolls directly upon the opposite lower surface of the eave E1 to capture the eave E1 between the first and second wheels, and the third wheel 622a rolls along the edge of the eave E1.

The wheeled guide extrusion 816a includes a roof reflector attachment bracket 824a extending inwardly therefrom, i.e., toward the opposite side of the roof, in the manner of the bracket 624a of the guide 616a. The bracket 824a is a portion of the extrusion forming the wheeled guide 816a and has two opposed parallel arms. However, rather than a threaded clamp being installed in the bracket 824a, a clevis pin 826a is provided. It will be seen that the holes through the two arms of the bracket 824a may be threaded, if desired, and a threaded clamp, such as the clamp 626a, may be used instead.

An upper actuator cable clamp 828a is installed upon the upper portion of the guide 816a for the attachment of the cable 122 thereto, in the general configuration shown in FIGS. 2A and 2B of the drawings. An additional cable clamp 828c is shown in broken lines on the lower portion of the guide 816a, and would be used for a guide installed along tracks and eaves to the opposite slope of the roof. It will be seen that the first guide 816a may include both clamps 828a and 828c, but only one of the two clamps being used, depending upon which side of the roof the guide is installed. In the same manner, the second guide 616b may include both clamps 628b and 628d, but only one of those two clamps being used.

While the wheeled guides 616a and 616b of FIGS. 6 and 7 are described as being formed of cylindrical rod material, it will be seen that except for their wheel axles, they may also be formed of a section of extruded material. Similarly, the guides 818a and 818b of FIG. 8 may be formed of cylindrical rod material in lieu of an extruded section, if desired. It will further be seen that the wheeled guides 816a and 816b may be used with either of the two track configurations 614a, 614b and 714a, 714b of FIGS. 6 and 7, if desired. The substitution of the threaded clamp 628a, 628b for the clevis or other pin 828a, 828b, or substitution of the clevis pins for the threaded clamps, has been noted further above. Thus, various combinations of the components comprising the wheeled guides and tracks of FIGS. 6 through 8 may be constructed.

It is to be understood that the present invention is not limited to the embodiments described above, but encompasses any and all embodiments within the scope of the following claims.

We claim:

1. A roof reflector for installation upon a roof, the roof having mutually opposed lateral eaves, the roof reflector comprising:
    a blanket of thermal insulation material, the blanket having a solar reflective upper surface, mutually opposed first and second lateral edges, and a roller attachment edge;
    a selectively operable roller, the roller attachment edge of the blanket being attached to the roller;
    mutually opposed upper L-shaped angles attached to a top surface of each of the lateral eaves;
    mutually opposed lower L-shaped angles attached to a bottom surface of each of the lateral eaves;
    a pair of C-shaped wheeled guides, each of the guides traveling along a corresponding one of the lateral eaves, each of the guides having a first wheel bearing against the corresponding upper angle, a second wheel bearing against the corresponding lower angle, a third wheel bearing against an edge of the corresponding lateral eave in a direction opposite the first and second wheels, a roof reflector attachment bracket extending from the guide, and an actuator cable clamp disposed upon the guide;
    an actuation system having a cable extending through the actuator cable clamp of the corresponding wheeled guides for selectively extending and retracting the blanket along the guide tracks; and
    a remotely disposed operator control communicating with the actuation system.

2. The roof reflector according to claim 1, wherein the remotely disposed operator control comprises a hand crank connected to the cable.

3. The roof reflector according to claim 1, wherein the remotely disposed operator control comprises:
    an electric motor communicating with the cable; and
    a remotely disposed electronic control unit communicating with the electric motor.

4. The roof reflector according to claim 1, wherein the pair of wheeled guides each comprise a frame formed of rigid rod.

5. The roof reflector according to claim 1, wherein the pair of wheeled guides are each formed of a length of extruded material.

6. The roof reflector according to claim 1, wherein the roof reflector attachment bracket of each said wheeled guide includes a threaded clamp.

7. The roof reflector according to claim 1, wherein the roof reflector attachment bracket of each said wheeled guide includes a clevis pin.

8. A roof reflector for installation upon a roof, the roof having mutually opposed lateral eaves, the roof reflector comprising:
    a blanket of thermal insulation material, the blanket having a solar reflective upper surface, mutually opposed first and second lateral edges, and a roller attachment edge;
    a selectively operable roller, the roller attachment edge of the blanket being attached to the roller;
    first and second guide tracks, each of the guide tracks having a vertical member and spaced apart, mutually parallel flanges extending normal thereto in a T-shaped configuration, the flanges capturing the corresponding eaves therebetween, the vertical member having first and second wheel bearing surfaces extending beyond the flanges;
    a C-shaped wheeled guide selectively traveling along each guide track, each of the wheeled guides having a first wheel bearing against the corresponding first wheel bearing surface, a second wheel bearing against the corresponding second wheel bearing surface, a third wheel bearing medially against the corresponding vertical member in a direction opposite the first and second wheels, a roof reflector attachment bracket extending from the guide, and an actuator cable clamp disposed upon the guide;
    an actuation system having a cable extending through the corresponding actuator cable clamp of each of the wheeled guides for selectively extending and retracting the blanket along the guide tracks; and
    a remotely disposed operator control communicating with the actuation system.

9. The roof reflector according to claim 8, wherein the remotely disposed operator control comprises a hand crank attached to the cable.

10. The roof reflector according to claim 8, wherein the remotely disposed operator control comprises:
    an electric motor connected to the cable; and
    a remotely disposed electronic control unit communicating with the electric motor.

11. The roof reflector according to claim 8, wherein the wheeled guides each comprise a frame formed of rigid rod.

12. The roof reflector according to claim 8, wherein the wheeled guides are each formed of a length of extruded material.

13. The roof reflector according to claim 8, wherein the roof reflector attachment bracket of each said wheeled guide includes a threaded clamp.

14. The roof reflector according to claim 8, wherein the roof reflector attachment bracket of each said wheeled guide includes a clevis pin.

15. A roof reflector for installation upon a roof, the roof having mutually opposed lateral eaves, each of the eaves having an upper surface, a lower surface, and an edge, the roof reflector comprising:
    a blanket of thermal insulation material, the blanket having a solar reflective upper surface, mutually opposed first and second lateral edges, and a roller attachment edge;

a selectively operable roller, the roller attachment edge of the blanket being attached to the roller;

a pair of wheeled guides, wherein each said wheeled guide selectively travels along a corresponding one of the lateral eaves, each of the wheeled guides having a first wheel bearing against the upper surface of the respective eaves, a second wheel bearing against the lower surface of the respective eaves, a third wheel bearing against the edge of the respective eaves, the third wheel being normal to the first and second wheels, a roof reflector attachment bracket extending from the guide, and an actuator cable clamp disposed upon the guide;

an actuation system having a cable extending through the actuator cable clamp of the corresponding wheeled guide for selectively extending and retracting the blanket along the guide tracks; and a remotely disposed operator control communicating with the actuation system.

16. The roof reflector according to claim 15, wherein the remotely disposed operator control comprises a hand crank connected to the cable.

17. The roof reflector according to claim 15, wherein the remotely disposed operator control comprises:
   an electric motor connected to the cable; and
   a remotely disposed electronic control unit communicating with the electric motor.

18. The roof reflector according to claim 15, wherein the pair of wheeled guides is formed of a material selected from the group consisting of rigid rod and extruded material.

19. The roof reflector according to claim 15, wherein the roof reflector attachment bracket of each said wheeled guide includes a threaded clamp.

20. The roof reflector according to claim 15, wherein the roof reflector attachment bracket of each said wheeled guide includes a clevis pin.

* * * * *